(12) United States Patent
Cho et al.

(10) Patent No.: US 8,325,302 B2
(45) Date of Patent: Dec. 4, 2012

(54) VISIBLE-LIGHT BLOCKING MEMBER, INFRARED SENSOR INCLUDING THE VISIBLE-LIGHT BLOCKING MEMBER, AND LIQUID CRYSTAL DISPLAY DEVICE INCLUDING THE INFRARED SENSOR

(75) Inventors: Byeong-Hoon Cho, Seoul (KR); Sung-Hoon Yang, Seoul (KR); Kap-Soo Yoon, Seoul (KR); Ki-Hun Jeong, Cheongan-si (KR); Kyung-Sook Jeon, Yongin-si (KR); Woong-Kwon Kim, Cheonan-si (KR); Sang-Youn Han, Seoul (KR); Dae-Cheol Kim, Suwon-si (KR); Jung-Suk Bang, Guri-si (KR)

(73) Assignee: Samsung Display Co., Ltd., Yongin (KR)

( * ) Notice: Subject to any disclaimer, the term of this patent is extended or adjusted under 35 U.S.C. 154(b) by 433 days.

(21) Appl. No.: 12/722,766

(22) Filed: Mar. 12, 2010

(65) Prior Publication Data

US 2011/0032461 A1 Feb. 10, 2011

(30) Foreign Application Priority Data

Aug. 5, 2009 (KR) .................. 10-2009-0072167

(51) Int. Cl.
*G02F 1/1335* (2006.01)
(52) U.S. Cl. ........................................ 349/117; 349/129
(58) Field of Classification Search .................. 349/117, 349/129
See application file for complete search history.

(56) References Cited

U.S. PATENT DOCUMENTS

| | | | | |
|---|---|---|---|---|
| 5,376,558 A | * | 12/1994 | Sudo et al. | 438/59 |
| 2005/0243023 A1 | | 11/2005 | Reddy et al. | |
| 2008/0164473 A1 | | 7/2008 | Tai et al. | |
| 2009/0231511 A1 | * | 9/2009 | Takahashi et al. | 349/61 |

FOREIGN PATENT DOCUMENTS

| | | |
|---|---|---|
| JP | 2003-262850 | 9/2003 |
| JP | 2008-153427 | 7/2008 |
| JP | 2008-306080 | 12/2008 |
| JP | 2009-086565 | 4/2009 |
| KR | 1020070008743 | 1/2007 |
| KR | 1020080028270 | 3/2008 |
| KR | 1020080035360 | 4/2008 |
| KR | 1020090002466 | 1/2009 |

* cited by examiner

*Primary Examiner* — Phu Vu
(74) *Attorney, Agent, or Firm* — H.C. Park & Associates, PLC

(57) ABSTRACT

In a visible-light blocking member, an infrared sensor including the visible-light blocking member, and a liquid crystal display including the infrared sensor, a visible-light blocking member is a structure including amorphous germanium or a compound of amorphous germanium and has higher transmittance for a wavelength of an infrared ray region than for a wavelength of a visible light region. Accordingly, sensitivity to infrared rays may be increased by applying the visible-light blocking member to the infrared sensor.

18 Claims, 10 Drawing Sheets

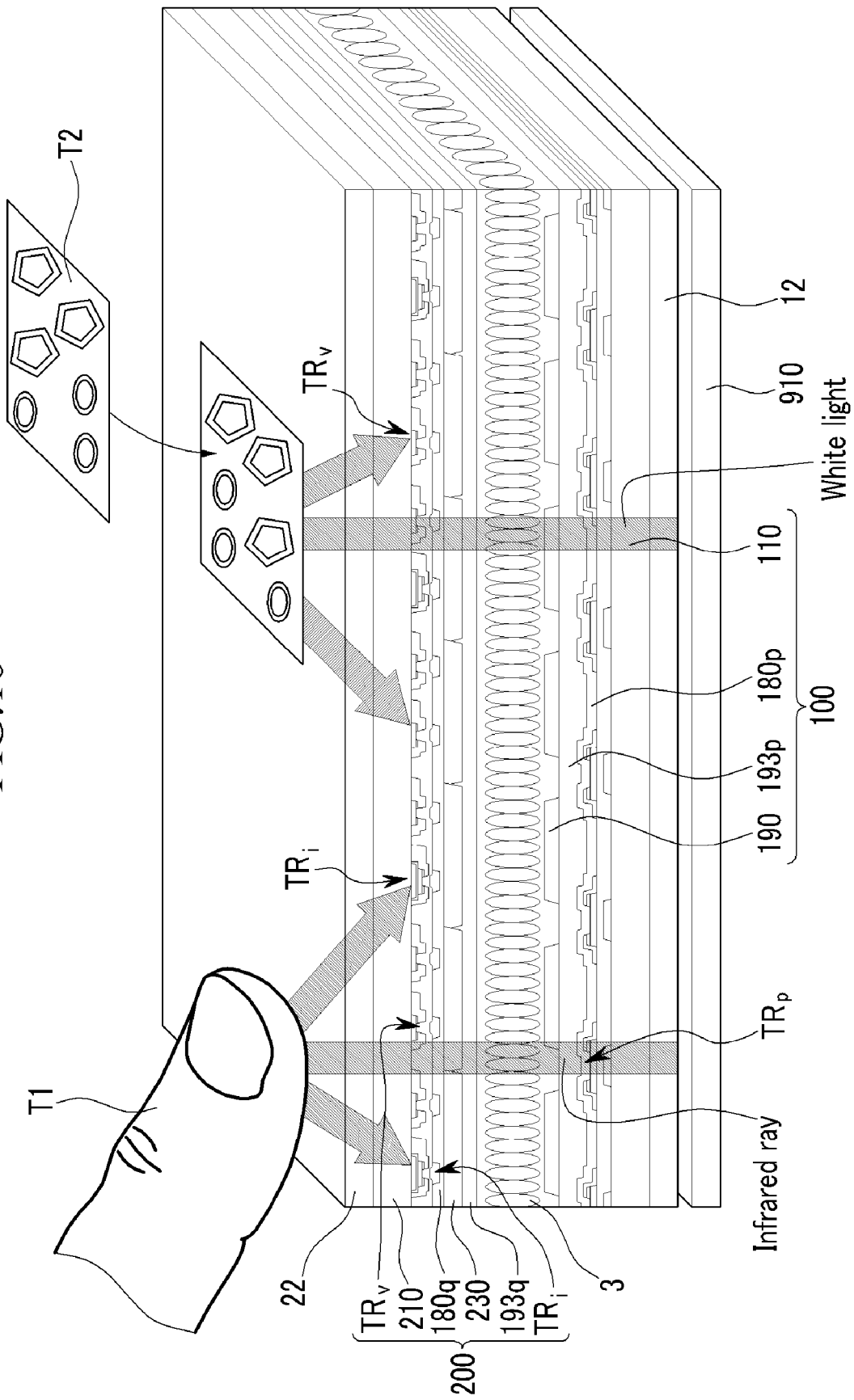

VISIBLE-LIGHT BLOCKING MEMBER, INFRARED SENSOR INCLUDING THE VISIBLE-LIGHT BLOCKING MEMBER, AND LIQUID CRYSTAL DISPLAY DEVICE INCLUDING THE INFRARED SENSOR

CROSS REFERENCE TO RELATED APPLICATION

This application claims priority from and the benefit of Korean Patent Application No. 10-2009-0072167, filed on Aug. 5, 2009, which is hereby incorporated by reference for all purposes as if fully set forth herein.

BACKGROUND OF THE INVENTION

1. Field of the Invention

Exemplary embodiments of the present invention relate to a visible-light blocking member, an infrared sensor including the visible-light blocking member, and a liquid crystal display including the infrared sensor. In detail, exemplary embodiments of the present invention is relate to a visible-light blocking member including a material that blocks visible light, an infrared sensor including the visible-light blocking member, and a liquid crystal display including the infrared sensor.

2. Discussion of the Background

Various flat panel displays have been developed and used. Among them, a liquid crystal display is widely used as a flat panel display.

Recently, a sensing device as the liquid crystal display having a touch sensing function or an image sensing function has been actively researched. However, the conventional sensing device mostly realizes the sensing function or the image sensing function through physical changes such that it is difficult to obtain high reliability. Particularly, when the visible light and infrared rays are simultaneously used to execute the sensing function, the infrared sensing function may be deteriorated by the visible light.

The above information disclosed in this Background section is only for enhancement of understanding of the background of the invention and may contain information that does not form part of the prior art that is already known by a person of ordinary skill in the art.

SUMMARY OF THE INVENTION

Exemplary embodiments of the present invention provide a visible-light blocking member that effectively blocks visible light.

Exemplary embodiments of the present invention also provide an infrared sensor including the visible-light blocking member.

Exemplary embodiments of the present invention also provide a liquid crystal is display including the infrared sensor.

Additional features of the invention will be set forth in the description which follows, and in part will be apparent from the description, or may be learned by practice of the invention.

An exemplary embodiment of the present invention discloses a visible-light blocking member structure including amorphous germanium or a compound of amorphous germanium having a higher transmittance for a wavelength of an infrared ray region than for a wavelength of a visible light region.

An exemplary embodiment of the present invention also discloses an infrared sensor that includes a visible-light blocking member including amorphous germanium or a compound of amorphous germanium having higher transmittance for a wavelength of an infrared ray region than for a wavelength of a visible light region. An insulating layer is disposed under the visible-light blocking member. An active layer overlaps the visible-light blocking member under the insulating layer. An ohmic contact layer is disposed under the active layer. A source electrode is disposed under the ohmic contact layer. A drain electrode is separated from the source electrode and is disposed under the ohmic contact layer. A gate insulating layer is disposed under the active layer, the source electrode, and the drain electrode. A gate electrode overlaps the active layer under the gate insulating layer.

An exemplary embodiment of the present invention also discloses a liquid crystal display that includes a lower panel including a pixel transistor; a liquid crystal layer disposed on the lower panel; and an upper panel including at least one infrared sensor disposed on the liquid crystal layer. The infrared sensor includes a visible-light blocking member as a structure including amorphous germanium or a compound of amorphous germanium having higher is transmittance for a wavelength of an infrared ray region than for a wavelength of a visible light region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 10 is a view showing a method for sensing by using a liquid crystal display according to an exemplary embodiment of the present invention.

DETAILED DESCRIPTION OF THE ILLUSTRATED EMBODIMENTS

Figure 1:
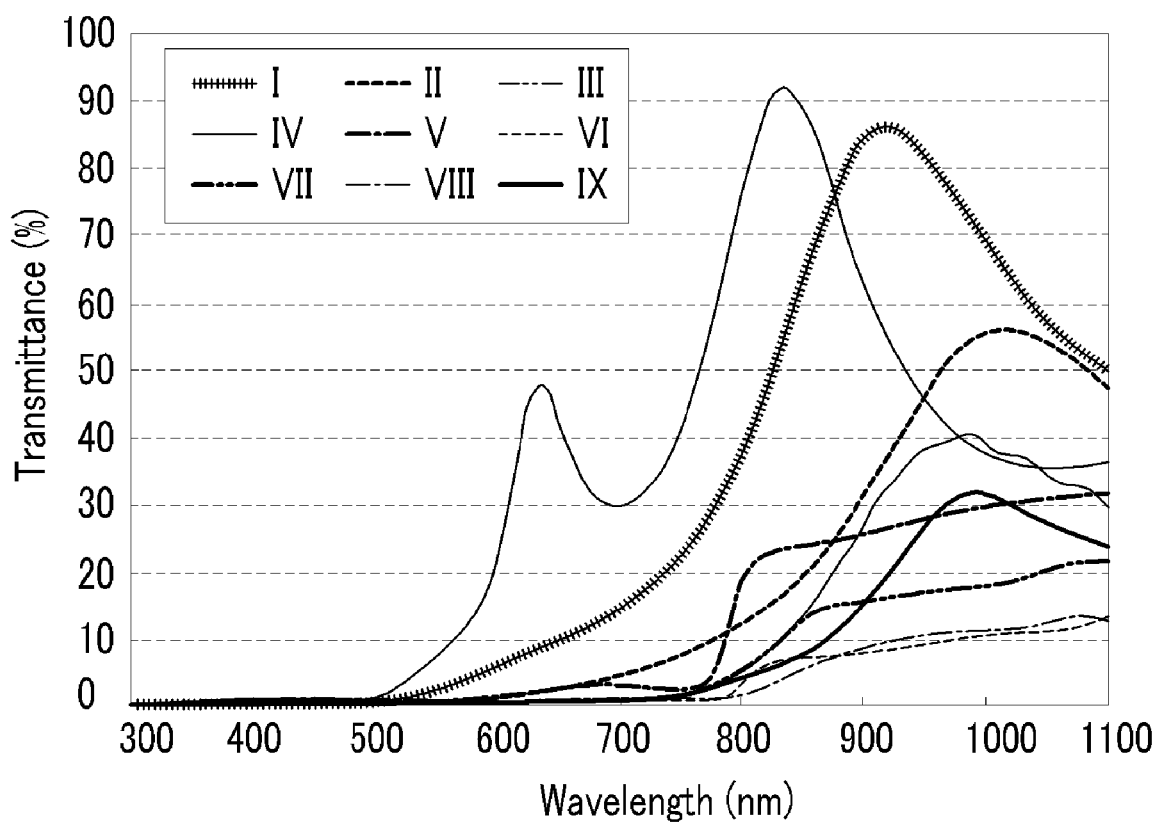
FIG. 1 is a graph showing transmittance results of an experiment related to transmittance of a visible-light blocking member according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

The structural shapes, sizes, ratios, numbers, etc., are schematically illustrated in the accompanying drawings such that they may be altered more or less. The drawings are shown from the viewpoint of observation such that the directions or locations in explaining the drawings may be variously changed depending upon the position of the observer. Even when reference is made to different elements, like reference numerals may be used to designate those elements. When the terms "include," "have," "consist of," or the like are used, the relevant subject may include other parts unless the term "only" is used to define the contents thereof. When explanation is made by way of a singular term, it may be interpreted in a plural manner as well as in a singular manner. Even when the numerical values, shapes, size comparisons, positional relations, etc., are not explained with the adverb "about" or "substantially," they may be so interpreted to include the common error ranges. Even when the terms of "after," "before," "and," "here," "subsequently," or the like are introduced, they are not meant to define temporal locations. The terms of "first," "second," etc. are used only for convenience in distinction selectively, commutatively, or repeatedly, and are not meant to be read in any defined manners. It will be understood that when an element is referred to as being "on," "over," "above," "below," "beside," or "connected to" another element, it can be directly on, over, above, below, beside, or connected to the other element, or one or more intervening elements may be present. In contrast, when an element is referred to as being "directly on" "directly over," "directly above," "directly below," "directly beside," or "directly connected to" another element, there are no intervening elements present. When the connective "or" is used to connect two elements, it is meant to indicate the respective elements and a combination thereof, but when the quantifier "any one of" is attached to the connective, it is meant to indicate only the respective elements.

According to an exemplary embodiment of the present invention, an infrared sensor sensing infrared rays includes a visible-light blocking member preventing visible light transmission. This visible-light blocking member is made of a material having low transmittance for the visible light region and high transmittance for the infrared ray region such that the Signal-to-Noise Ratio (SNR) and the sensitivity of the infrared ray region may be optimized.

Also, the visible-light blocking member according to an exemplary embodiment of the present invention may withstand a high temperature of more than about 200 degrees Celsius. Accordingly, the visible-light blocking member may remain undamaged in a chemical vapor deposition process after forming the visible-light blocking member such that a process yield may be improved.

The Visible-Light Blocking Member

A visible-light blocking member is a selective transmission layer blocking incident electromagnetic radiation of a visible light region of a wavelength in a range from about 300 nm to about 800 nm and transmitting incident electromagnetic radiation of an infrared ray region of a wavelength in a range from about 800 nm to about 1100 nm.

The visible-light blocking member according to an exemplary embodiment of the present invention may include amorphous germanium (a-Ge) or a compound of amorphous germanium that block the range of visible light and transmit the range of infrared rays. For example, the compound of amorphous germanium may be amorphous silicon germanium (a-SiGe), but it is not limited thereto.

For example, amorphous silicon (a-Si) has two transmittance peaks including transmittance of about 90% in the region of the infrared rays having a wavelength of about 840 nm and transmittance of about 45% in the region of the visible light having a wavelength of about 640 nm. This amorphous silicon (a-Si) may be included in the visible-light blocking member along with the amorphous germanium (a-Ge) such that the transmission region of the infrared rays may be controlled. Here, the amorphous silicon (a-Si) may be included along with the amorphous germanium (a-Ge) to control the transmission region of the infrared rays by forming the amorphous silicon germanium (a-SiGe) by appropriately mixing the amounts of the silicon and the germanium and depositing a thin film of the mixture to form the amorphous silicon germanium (a-SiGe), or may include alternately depositing a thin film of the amorphous silicon (a-Si) in an appropriate amount and depositing a thin film of the amorphous germanium (a-Ge) in an appropriate amount.

According to such exemplary embodiments of the present invention, the visible-light blocking member may include at least one of the amorphous germanium (a-Ge) thin film and the amorphous silicon germanium (a-SiGe) thin film. As described above, the amorphous germanium (a-Ge) has low transmittance for the visible light region and high transmittance for the infrared ray region, and may therefore be included in the visible-light blocking member.

According to another exemplary embodiment of the present invention, the visible-light blocking member may include at least one of the amorphous germanium (a-Ge) thin film and the amorphous silicon germanium (a-SiGe) thin film, and may further include at least one amorphous silicon (a-Si) thin film. As described above, the amorphous silicon (a-Si) thin film has two transmittance peaks such that the transmittance region of the infrared rays may be further controlled when the visible-light blocking member includes the amorphous silicon (a-Si) thin film.

Also, according to another exemplary embodiment of the present invention, the visible-light blocking member may further include at least one micro-crystalline silicon (mc-Si) thin film. Like the amorphous silicon (a-Si), the transmittance region of the infrared rays may be further controlled when the visible-light blocking member includes the micro-crystalline silicon (mc-Si) thin film.

Also, according to another exemplary embodiment of the present invention, the visible-light blocking member may further include an assistance thin film wholly reducing the transmittance in the visible light region. In this case, the transmittance of both the infrared ray region and the visible light region may be reduced, but the transmittance of the visible light region is reduced to less than about 30% such that the photo-sensitivity of the infrared ray region may be increased.

An example of the material for the assistance thin film may be a metal. The metal may be molybdenum (Mo), aluminum (Al), titanium (Ti), copper (Cu), or chromium (Cr). They is may be used singularly or as a mixture.

As another example, the material for the assistance thin film may be a metal oxide. The metal oxide may be molybdenum oxide ($MoO_x$), aluminum oxide ($AlO_x$), titanium oxide ($TiO_x$), copper oxide ($CuO_x$), or chromium oxide ($CrO_x$). They may be used singularly or as a mixture.

Also, the material for the assistance thin film may be silicon oxide ($SiO_x$) or silicon nitride ($SiN_x$). They may be used singularly or as a mixture.

The transmittance of the light may be determined according to the thickness of the visible-light blocking member. When the thickness of the visible-light blocking member is less than about 500 Å, the total transmittance is increased such that there is a problem that the transmittance of the visible light region is increased. On the other hand, when the thickness of the visible-light blocking member is more than 4000 Å, the total transmittance is decreased such that there is a problem that the transmittance of the infrared ray region is decreased. Accordingly, the thickness of the visible-light blocking member may be in the range from about 500 Å to about 4000 Å.

Experiment Related to the Transmittance of the Visible-Light Blocking Member

A first visible-light blocking member "I" having a thickness of 1000 Å and made of amorphous silicon germanium as a single layer was provided. A second visible-light blocking member "II" having a thickness of 1000 Å and made of amorphous germanium as a single layer was also provided. A third visible-light blocking member "III" having a thickness of 2000 Å and made of amorphous germanium as a single layer was also provided. A fourth visible-light blocking member "IV" having a thickness of 2000 Å and made of amorphous silicon as a single layer was also provided. A fifth visible-light blocking member "V" having a thickness of 1 μm and made of an organic material (BM, black matrix) including black pigments as a single layer was also provided. A sixth visible-light blocking member "VI" having a thickness of 2 μm and made of the organic material including the black pigments was also provided. A seventh visible-light blocking member "VII" having an amorphous germanium thin film with a thickness of 1000 Å and an amorphous silicon germanium thin film with a thickness of 2000 Å was also provided. An eighth visible-light blocking member "VIII" including the amorphous germanium thin film with a thickness of 2000 Å and the amorphous silicon germanium thin film with a thickness of 2000 Å, and a ninth visible-light blocking member "IX" including the amorphous germanium thin film with a thickness of 1000 Å and the amorphous silicon germanium thin film with a thickness of 1000 Å were also provided.

The transmittance of each visible-light blocking member was measured and is shown in FIG. 1. Referring to FIG. 1, the fourth visible-light blocking member IV has two peaks of a high transmittance of about 90% in the infrared ray region of about 840 nm and a relatively lower transmittance of about 45% in the visible light region of about 640 nm.

The second visible-light blocking member II and the third visible-light blocking member III each have a single peak, and each have a low transmittance in the visible light region and a relatively high transmittance in the infrared ray region. The first visible-light blocking member I also has a single peak, and the wavelength of the peak maximum is about 920 nm and is moved in the left direction in the graph of FIG. 1 compared to the second visible-light blocking member II and the third visible-light blocking member III.

The sixth visible-light blocking member VI has a transmittance of about 5 to 10% in the infrared ray region while blocking the visible light. The fifth visible-light blocking member V has a transmittance about 20 to 30% that is higher than the sixth visible-light blocking is member VI for the infrared ray region, however the fifth visible-light blocking member V has a transmittance of several percent in the visible light region. Compared with the fifth visible-light blocking member V and the sixth visible-light blocking member VI, the third visible-light blocking member III blocks the visible light well and transmits the infrared rays better than the sixth visible-light blocking member VI.

The seventh visible-light blocking member VII, the eighth visible-light blocking member VIII, and the ninth visible-light blocking member IX may block the visible light of about 700 nm to 800 nm better compared with the second visible-light blocking member II and the third visible-light blocking member III.

As shown in FIG. 1, the first visible-light blocking member I, the second visible-light blocking member II, the third visible-light blocking member III, the seventh visible-light blocking member VII, the eighth visible-light blocking member VIII, and the ninth visible-light blocking member IX including the amorphous germanium or the amorphous silicon germanium have low transmittance for the visible light region whereas they have high infrared ray region transmittance. As shown by the curve of the transmittance of the first visible-light blocking member I in which the amorphous silicon is included with the amorphous germanium, the wavelength where the transmittance is maximum may be changed by including the amorphous silicon.

Infrared Sensor Structure

Figure 2:
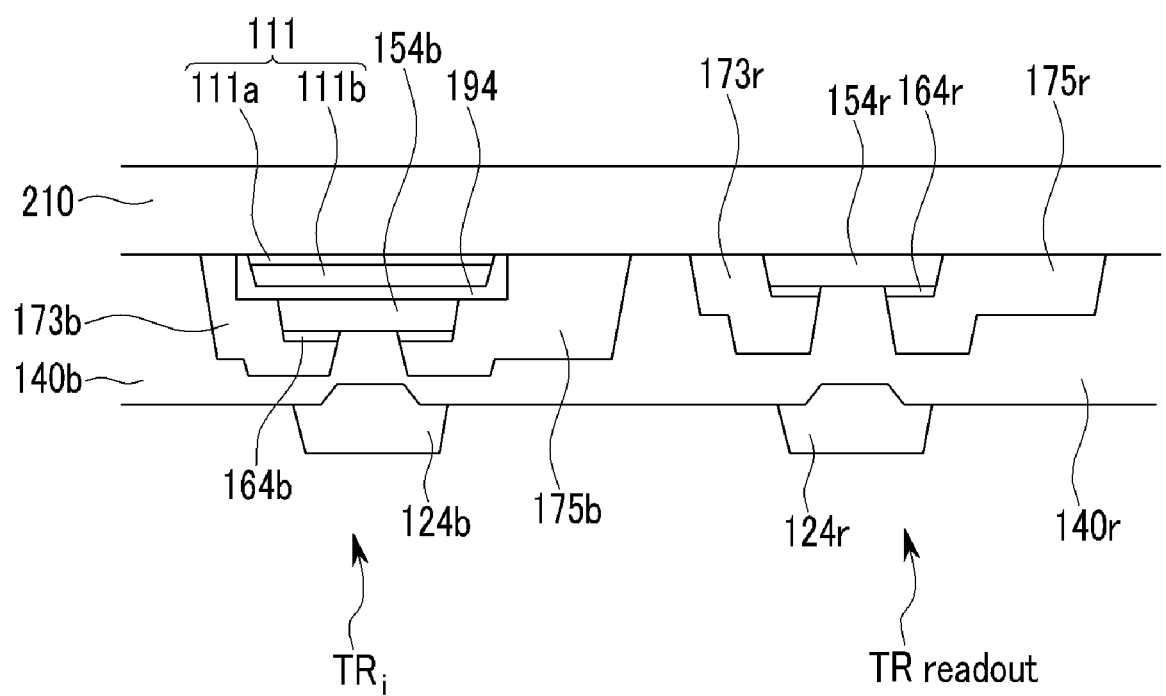
FIG. 2 is a cross-sectional view of an infrared sensor according to an exemplary embodiment of the present invention.

FIG. 2 is a cross-sectional view of an infrared sensor structure according to an exemplary embodiment of the present invention. Referring to FIG. 2, an infrared sensor $TR_i$ is disposed under an upper substrate 210, and a readout transistor $TR_{readout}$ that is electrically connected to the infrared sensor $TR_i$ is disposed with the same layer as the infrared sensor $TR_i$.

The infrared sensor $TR_i$ may include an active layer 154b, an ohmic contact layer 164b, a source electrode 173b, a drain electrode 175b, a gate insulating layer 140b, and a visible-light blocking member 111 overlapping the active layer 154b on the gate electrode 124b and the active layer 154b.

The active layer 154b is disposed under the upper substrate 210 and may include amorphous silicon germanium. The ohmic contact layer 164b may be disposed under the active layer 154b. The source electrode 173b may be disposed under the ohmic contact layer 164b. The drain electrode 175b may be disposed under the ohmic contact layer 164b to be separated from the source electrode 173b. The gate insulating layer 140b may be disposed under the active layer 154b, the source electrode 173b, and the drain electrode 175b. The gate electrode 124b may be disposed under the gate insulating layer 140b to be overlapped with the active layer 154b.

The visible-light blocking member 111 may be disposed between the upper substrate 210 and the active layer 154b. An insulating layer 194 made of an insulating material such as silicon nitride may be disposed between the visible-light blocking member 111 and the active layer 154b.

The visible-light blocking member 111 is a selective transmission layer that blocks the visible light of a wavelength in a range from about 300 nm to about 800 nm and transmits the infrared rays of a wavelength in a range from about 800 nm to about 1100 nm. The visible-light blocking member shown in FIG. 2 is described above such that a further detailed description is omitted here.

In the present exemplary embodiment, the visible-light blocking member 111 including an amorphous germanium thin film 111a with a thickness of about 1000 Å and an amorphous silicon germanium thin film 111b with a thickness of about 2000 Å is described as an example.

Here, when the germanium included in the amorphous silicon germanium thin film 111b is less than about 20 at %, there is a problem in that the transmittance is increased in the visible light region, and when the germanium included in the amorphous silicon germanium thin film 111b is more than about 70 at %, there is a problem in that the wavelength of the region in which the transmittance is high in the infrared ray region may exceed about 1100 nm. Accordingly, the germanium included in the amorphous silicon germanium thin film 111b may be in the range from about 20 at % to 70 at %.

The readout transistor $TR_{readout}$ may include a semiconductor layer 154r, an ohmic contact layer 164r, a source electrode 173r, a drain electrode 175r, a gate insulating layer 140r, and a gate electrode 124r.

The semiconductor layer 154r may be disposed under the upper substrate 210. The ohmic contact layer 164r may be disposed under the semiconductor layer 154r. The source electrode 173r may be disposed under the ohmic contact layer 164r. The drain electrode 175r may be disposed under the ohmic contact layer 164r to be separated from the source electrode 173r. The gate insulating layer 140r may be disposed under the semiconductor layer 154r, the source electrode 173r, and the drain electrode 175r. The gate electrode 124r may be disposed under the gate insulating layer 140r to be overlapped with the semiconductor layer 154r.

Experiment Related to the Optical Current

The infrared sensor $TR_i$ shown in FIG. 2 was manufactured, and the visible-light blocking member 111 included in the infrared sensor $TR_i$ was classified into a first visible-light blocking member "I" including the amorphous germanium thin film 111a with the thickness of is about 1000 Å and the amorphous silicon germanium thin film 111b with the thickness of about 2000 Å. A second infrared sensor $TR_i$ was manufactured having the BM layer with a thickness of about 1 μm as a visible-light blocking member 111 and classified into a second visible-light blocking member "II." A third infrared sensor $TR_i$ was manufactured having the BM layer with a thickness of about 2 μm as a visible-light blocking member 111 and classified into a third visible-light blocking member "III." Also, a dark state "IV" without visible light and a case "V" without the visible-light blocking member 111 in the infrared sensor $TR_i$ were classified.

Figure 3:
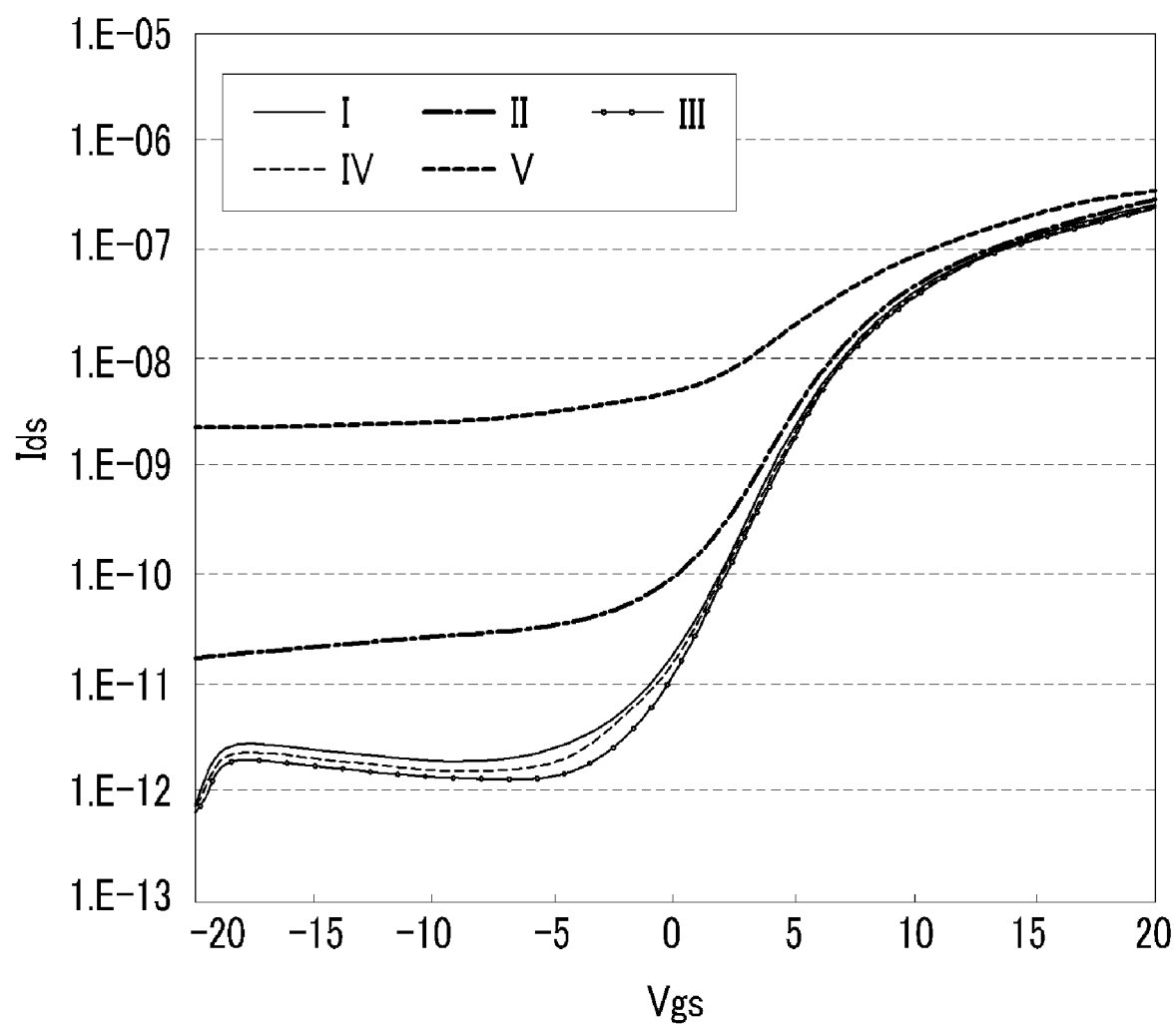
FIG. 3 and FIG. 4 are graphs showing optical currents measured according to experiments related to optical currents of embodiments of the present invention.
Figure 4:
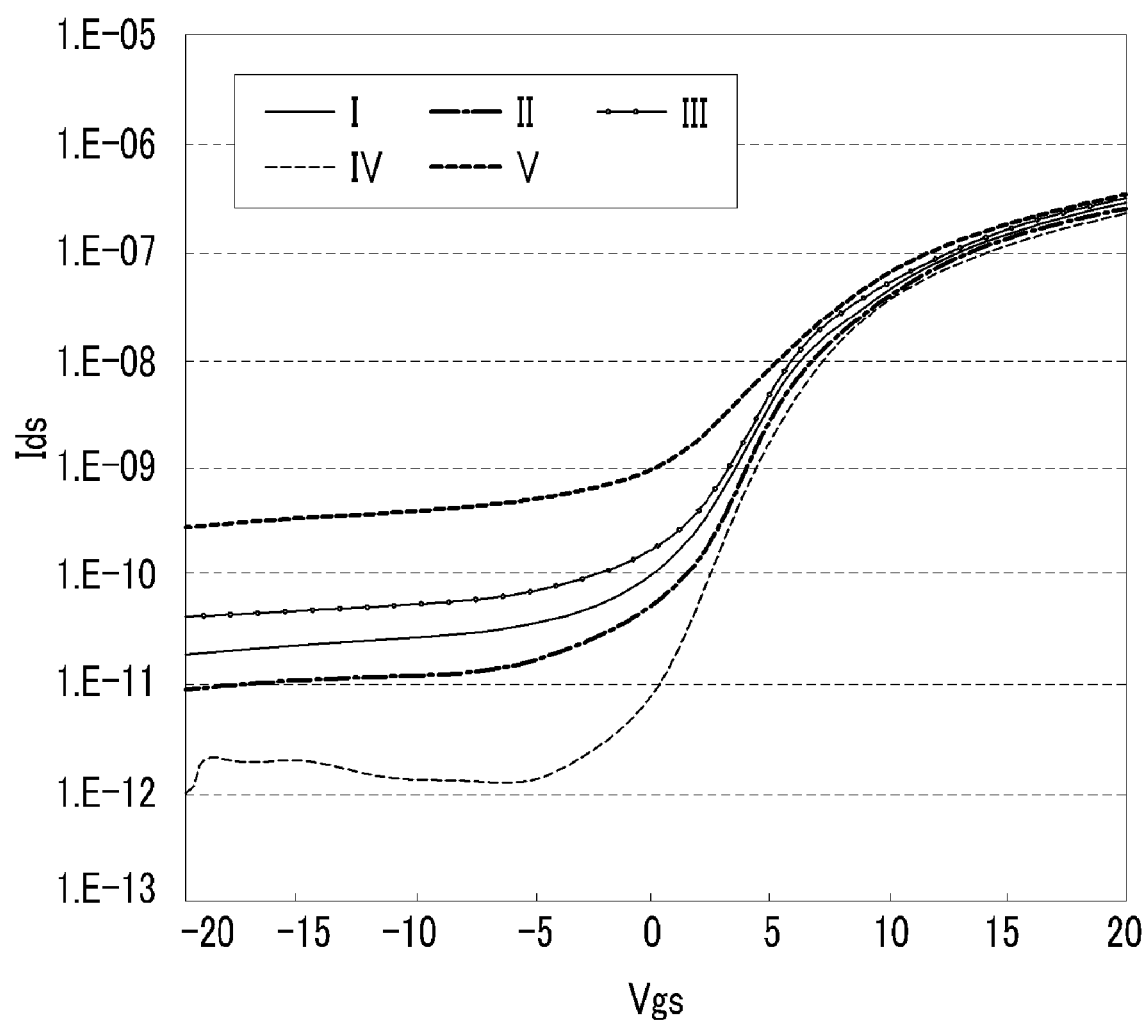

Further, when providing the visible light and the infrared rays, the current Ids between the drain electrode 175b and the source electrode 173b for the voltage Vgs between the gate electrode 124b and the source electrode 173b was measured for five cases including the infrared sensor $TR_i$, and the results thereof are shown in FIG. 3 and FIG. 4. In detail, FIG. 3 shows the case using visible light as the light source, and FIG. 4 shows the case using infrared rays as the light source.

Referring to FIG. 3, the visible light optical current for the second visible-light blocking member II is high. The first visible-light blocking member I and the third visible-light blocking member III have an excellent visible light blocking effect that overlaps the dark state IV to a substantial degree.

Referring to FIG. 4, the infrared ray optical current increases in the sequence of the second visible-light blocking member II, the first visible-light blocking member I, and the third visible-light blocking member III. However, in the case of the second visible-light blocking member II, the infrared ray optical current is not high compared with the visible light optical current.

Figure 5:
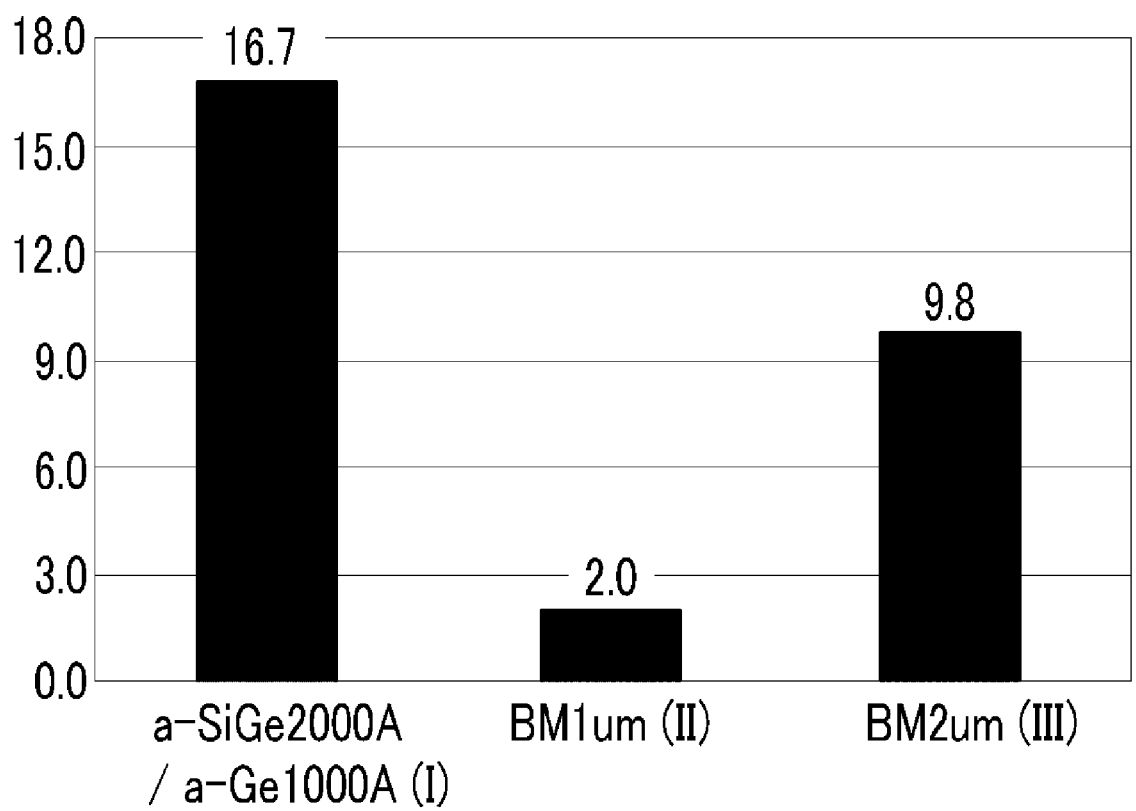
FIG. 5 shows a bar graph of the ratio of visible light optical currents to infrared optical currents in the experiments related to the optical currents of exemplary embodiments of the present invention.

FIG. 5 is a bar graph showing the ratio of the visible light optical current to the is infrared ray optical current for each visible-light blocking member when Vgs is about −7V.

Referring to FIG. 5, the first visible-light blocking member I has a much better band filter characteristic for the infrared rays than the second visible-light blocking member II and the third visible-light blocking member III. That is, when forming the visible-light blocking member 111 (FIG. 2) by depositing the amorphous germanium thin film 111a with the thickness of about 1000 Å and the amorphous silicon germanium thin film 111b with the thickness of about 2000 Å, an excellent blocking characteristic for the visible light and an excellent transmission characteristic for the infrared rays may be obtained while the visible-light blocking member 111 thickness may be much less than the comparable BM layers.

Also, it is possible for the amorphous germanium thin film and the amorphous silicon germanium thin film to be formed through a chemical vapor deposition method at a higher temperature than that possible for forming a BM layer. That is, the following process can be performed at a temperature of greater than about 200° C., which is too high of a temperature to form the BM layer.

Liquid Crystal Display

Figure 6:
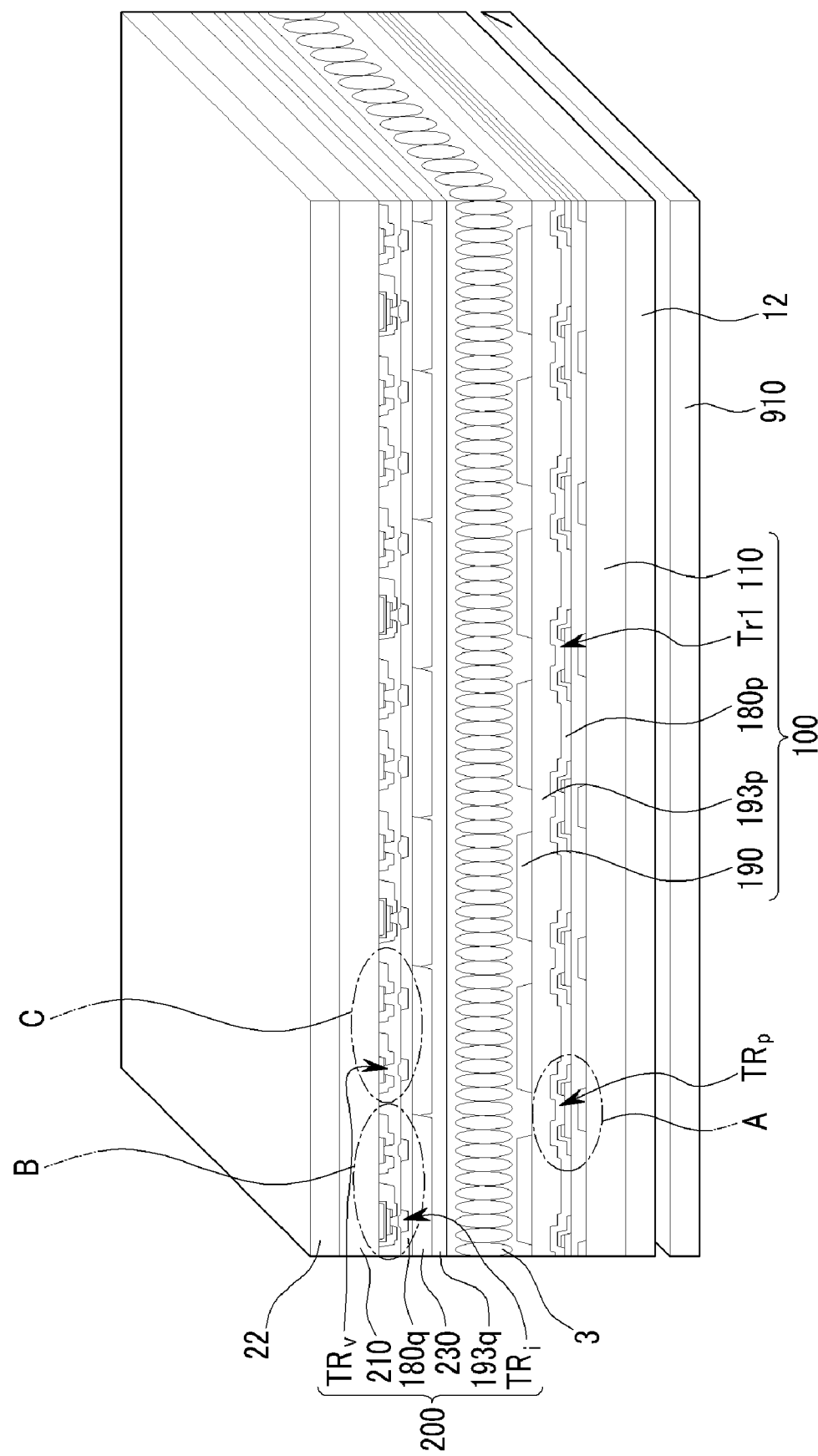
FIG. 6 is a perspective view illustrating a liquid crystal display according to an exemplary embodiment of the present invention.
Figure 7:
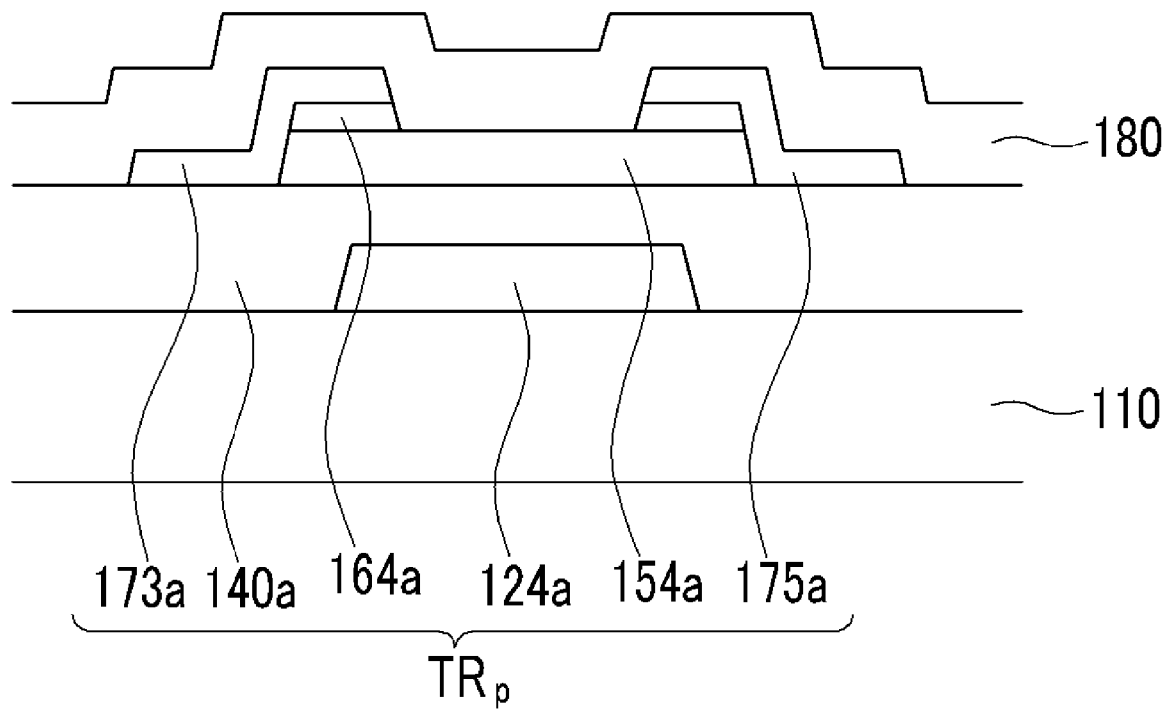
FIG. 7 is an enlarged view of portion "A" of FIG. 6.
Figure 8:
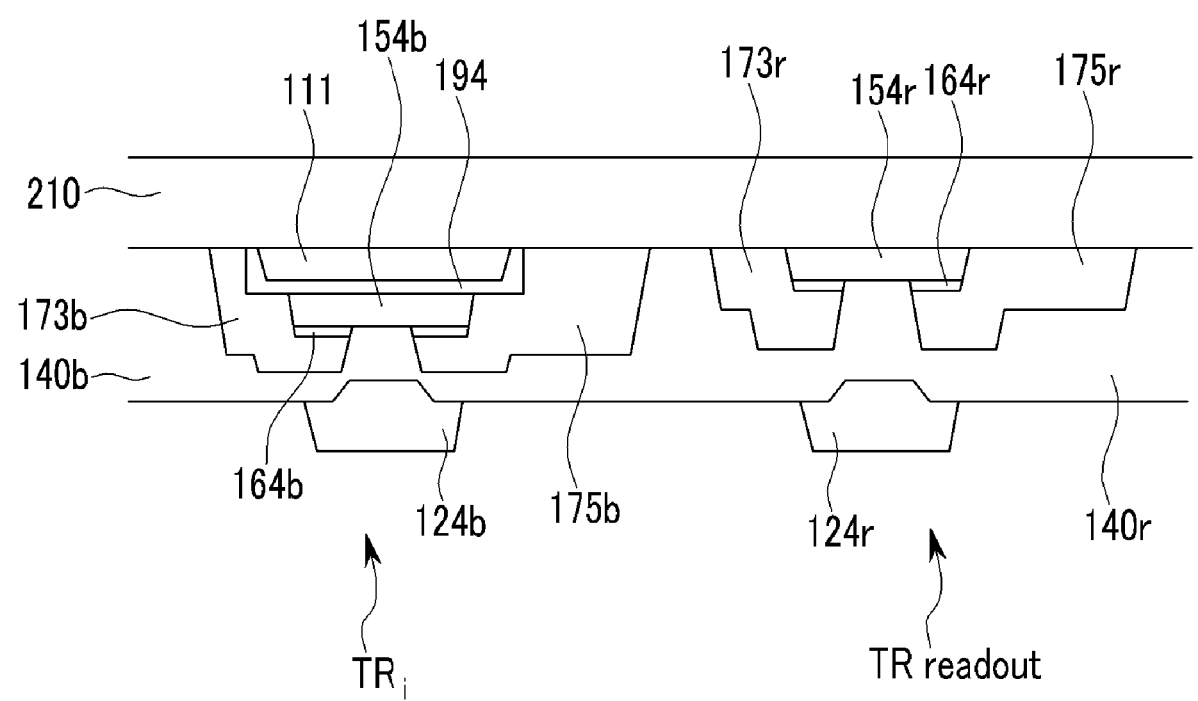
FIG. 8 is an enlarged view of portion "B" of FIG. 6.
Figure 9:
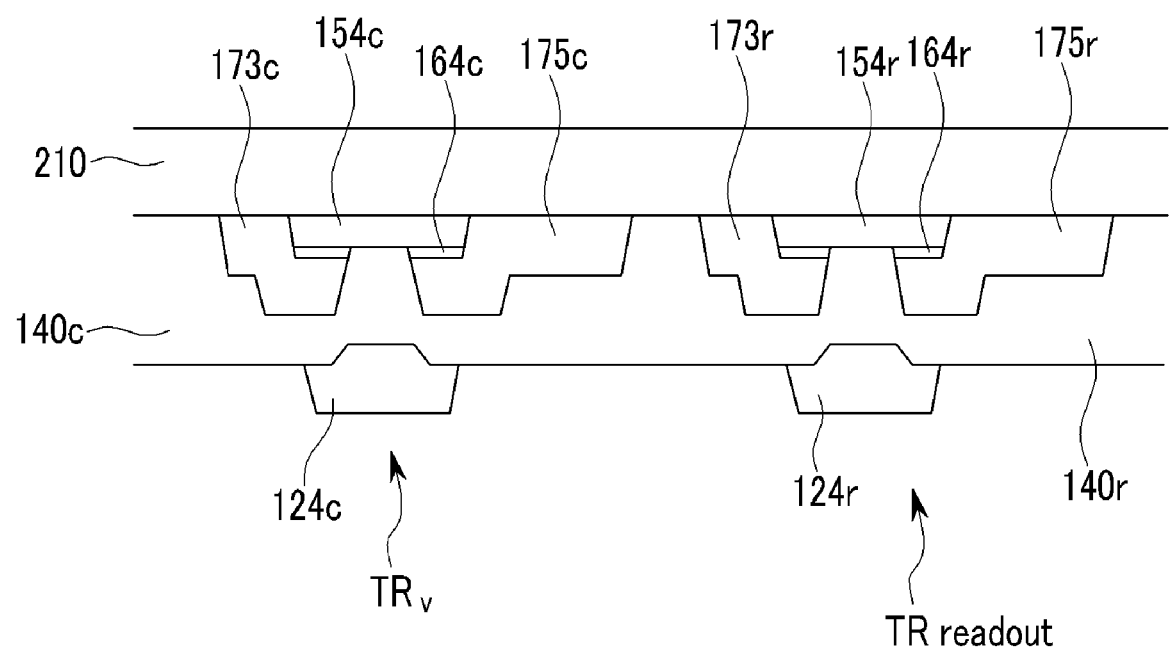
FIG. 9 is an enlarged view of portion "C" of FIG. 6.

FIG. 6 is a perspective view of a liquid crystal display according to an exemplary embodiment of the present invention. FIG. 7 is an enlarged view of portion "A" of FIG. 6. FIG. 8 is an enlarged view of portion "B" of FIG. 6. FIG. 9 is an enlarged view of portion "B" of FIG. 6.

Referring to FIG. 6, the liquid crystal display may include a lower panel 100, a liquid crystal layer 3 disposed on the lower panel 100, and an upper panel 200 disposed on the liquid crystal layer 3.

The lower panel 100 includes a lower substrate 110 and a pixel transistor $TR_p$ is disposed on the lower substrate 110. Referring to FIG. 7, which is an enlarged view of portion "A" where the pixel transistor $TR_p$ of FIG. 6 is positioned, the pixel transistor $TR_p$ includes a gate electrode 124a, a gate insulating layer 140a disposed on the gate electrode 124a, a semiconductor layer 154a overlapping the gate electrode 124a and disposed on the gate insulating layer 140a, an ohmic contact layer 164a disposed on the semiconductor layer 154a, a source electrode 173a disposed on the ohmic contact layer 164a, and a drain electrode 175a separated from the source electrode 173a on the ohmic contact layer 164a.

The lower panel 100 may further include a gate line (not shown) disposed on the lower substrate 110 and a data line (not shown) crossing the gate line. Here, the gate line may be connected to the gate electrode 124a of the pixel transistor $TR_p$. Also, the data line may be connected to the source electrode 173a of the pixel transistor $TR_p$.

The lower panel 100 may further include a passivation layer 180p disposed on the pixel transistor $TR_p$, an insulating layer 193p disposed on the passivation layer 180p, and a pixel electrode 190 disposed on the insulating layer 193p. Here, the pixel electrode 190 may be connected to the drain electrode 175a of the pixel transistor $TR_p$ while passing through the insulating layer 193p and the passivation layer 180p.

The upper panel 200 may include an upper substrate 210, light sensing elements $TR_i$ and $TR_v$ disposed under the upper substrate 210, a passivation layer 180q disposed under the light sensing elements $TR_i$ and $TR_v$, a color filter 230 disposed under the passivation layer 180q, and an insulating layer 193q disposed under the color filter 230.

The light sensing elements $TR_i$ and $TR_v$ may include at least one infrared sensor $TR_i$ and at least one visible-light sensor $TR_v$. The infrared sensor $TR_i$ and the visible-light sensor $TR_v$ may be formed uniformly on the whole upper panel 200 to sense the infrared rays and the is visible light on the whole region of the upper panel 200. As one example, the infrared sensor $TR_i$ and the visible-light sensor $TR_v$ are alternately arranged. As another example, the infrared sensor $TR_i$ and the visible-light sensor $TR_v$ may be disorderly arranged. As another example, the infrared ray sensor $TR_i$ and the visible ray sensor $TR_v$ may be arranged in a predetermined ratio.

The upper panel 200 may further include a readout line (not shown) connected to the light sensing elements $TR_i$ and $TR_v$ and transmitting a signal detected from the light sensing elements $TR_i$ and $TR_v$, and a readout transistor $TR_{readout}$ disposed between the light sensing elements $TR_i$ and $TR_v$. Here, the readout transistor $TR_{readout}$ may be disposed with the same layer as the light sensing elements $TR_i$ and $TR_v$ and closely positioned thereto.

The infrared sensor $TR_i$ and the visible light sensor $TR_v$ may be disposed under the upper substrate 210. Referring to FIG. 8 that shows an enlarged view of the infrared sensor $TR_i$ and the readout transistor $TR_{readout}$ disposed in portion "B" of FIG. 6, the infrared sensor $TR_i$ is disposed under the upper substrate 210, and the readout transistor $TR_{readout}$ that is electrically connected to the infrared ray sensor $TR_i$ is disposed with the same layer as the infrared ray sensor $TR_i$. The infrared sensor $TR_i$ and the readout transistor $TR_{readout}$ connected thereto were described with reference to FIG. 2 such that further overlapping description is omitted here.

Referring to FIG. 9 that shows an enlarged view of the visible-light sensor $TR_v$ and the readout transistor $TR_{readout}$ disposed in portion "C" of FIG. 6, the visible-light sensor $TR_v$ is disposed under the upper substrate 210, and the readout transistor $TR_{readout}$ electrically connected to the visible-light sensor $TR_v$ is disposed with the same layer as the visible-light sensor $TR_v$.

In detail, the visible light sensor $TR_v$ may include an active layer 154c, an ohmic contact layer 164c, a source electrode 173c, a drain electrode 175c, a gate insulating layer 140c, and a gate electrode 124c.

The active layer 154c is positioned under the upper substrate 210 and may include amorphous silicon. The ohmic contact layer 164c may be positioned under the active layer 154c. The source electrode 173c may be positioned under the ohmic contact layer 164c. The drain electrode 175c that is separated from the source electrode 173c may be positioned under the ohmic contact layer 164c. The gate insulating layer 140c may be positioned under the active layer 154c, the source electrode 173c, and the drain electrode 175c. The gate electrode 124c may be overlapped with the active layer 154c under the gate insulating layer 140c. Also, the readout transistor $TR_{readout}$ is substantially the same as that of FIG. 8 such that further description thereof is omitted here.

The liquid crystal display further includes a lower polarizer 12 disposed under the lower panel 100 and an upper polarizer 22 disposed on the upper panel 200. The intensity of the light provided to the lower panel 100 and the upper panel 200 is controlled by using the polarization characteristics of the lower polarizer 12 and the upper panel 200.

The liquid crystal display may further include a backlight unit 910 disposed under the lower panel 100. The backlight unit 910 includes at least one infrared ray emitting member (not shown) and at least one visible ray emitting member (not shown).

FIG. 10 is a view describing a method for sensing light using a liquid crystal display according to an exemplary embodiment of the present invention.

Referring to FIG. 10, infrared rays and white light are generated from the backlight unit 910. The infrared rays sequentially pass the lower polarizer 12, the lower panel 100, the liquid crystal layer 3, the upper panel 200, and the upper polarizer 22. Also, the white light sequentially passes the lower polarizer 12, the lower panel 100, the liquid crystal layer 3, is the upper panel 200, and the upper polarizer 22.

For the touch sensing of a first object T1 positioned on the liquid crystal display, the infrared rays provided from the backlight unit 910 may be used. When the first object T1 is close to the liquid crystal display, the infrared rays emitted from the liquid crystal display are reflected by the first object T1. Next, the reflected infrared rays are incident to and detected by the infrared ray sensor $TR_i$ positioned in the upper panel 200. Accordingly, the touch sensing for the first object T1 is executed, thereby obtaining the existence of the contact of the first object T1, the position of the contact, and the contact information for the shape and size thereof. Here, the visible light that is incident to the infrared sensor $TR_i$ is blocked by the visible-light blocking member 111 such that the photo-sensitivity of the infrared sensor $TR_i$ is increased.

When the gray level of the visible light emitted from the liquid crystal display is brighter than the gray level of the visible light incident to the liquid crystal display from the outside, the visible light emitted from the liquid crystal display may be used for the image sensing under the image sensing for a second object T2 close to the liquid crystal display. In detail, the visible light emitted from the sensing device is reflected by the second object T2. The reflected visible light is incident to and detected by the visible-light sensor $TR_v$ positioned in the upper panel 200. Accordingly, the image sensing for the second object T2 is executed, and thereby image information for the second object T2 such as the shape, the size, and the color may be obtained.

After confirming the contact portion of the second object T2 through the touch sensing, the gray level of the visible light emitted from the liquid crystal display toward the contact portion may be selectively changed such that the image sensing for the second object T2 may be further effectively executed. For example, when the gray level of the visible light is emitted from the liquid crystal display is darker than the gray level of the visible light incident to the liquid crystal display from the outside, the touch sensing using the infrared rays is firstly executed. The gray level of the visible light emitted from the liquid crystal display toward the contact portion of the second object T2 recognized through the touch sensing is selectively brightened such that the effective image sensing of the second object T2 is possible.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A visible-light blocking member as a structure, comprising amorphous germanium or a compound of amorphous germanium having higher transmittance for a wavelength of an infrared ray region than for a wavelength of a visible light region,
   wherein the structure comprises at least one of an amorphous germanium thin film and an amorphous silicon germanium thin film,
   wherein the structure comprises the amorphous silicon germanium thin film, and
   wherein the amorphous silicon germanium thin film comprises germanium at 20 at % to 70 at %.

2. The visible-light blocking member of claim 1, wherein the structure thickness is in a range of 500 Å to 4000 Å.

3. The visible-light blocking member of claim 2, wherein the structure further comprises at least one amorphous silicon thin film.

4. The visible-light blocking member of claim 2, wherein the structure further comprises at least one micro-crystalline silicon thin film.

5. The visible-light blocking member of claim 2, wherein the structure further comprises an assistance thin film that reduces transmittance in the visible light region.

6. The visible-light blocking member of claim 5, wherein the assistance thin film comprises a metal or a metal oxide.

7. The visible-light blocking member of claim 5, wherein the assistance thin film comprises silicon oxide or silicon nitride.

8. An infrared sensor, comprising:
a visible-light blocking member as a structure comprising amorphous germanium or a compound of amorphous germanium having higher transmittance for a wavelength of an infrared ray region than for a wavelength of a visible light region;
an insulating layer disposed under the visible-light blocking member;
an active layer overlapping with the visible-light blocking member and disposed under the insulating layer;
an ohmic contact layer disposed under the active layer;
a source electrode disposed under the ohmic contact layer;
a drain electrode separated from the source electrode and disposed under the ohmic contact layer;
a gate insulating layer disposed under the active layer, the source electrode, and the drain electrode; and
a gate electrode overlapping with the active layer and disposed under the gate insulating layer.

9. The infrared sensor of claim 8, wherein the structure comprises at least one of an amorphous germanium thin film and an amorphous silicon germanium thin film.

10. The infrared sensor of claim 9, wherein the structure comprises the amorphous silicon germanium thin film, and
the amorphous silicon germanium thin film comprises germanium at 20 at % to 70 at %.

11. The infrared sensor of claim 9, wherein the structure comprises a dual thin film structure comprising the amorphous germanium thin film and the amorphous silicon germanium thin film.

12. A liquid crystal display, comprising:
a lower panel comprising a pixel transistor;
a liquid crystal layer disposed on the lower panel; and
an upper panel comprising at least one infrared sensor disposed on the liquid crystal layer,
wherein the infrared sensor comprises a visible-light blocking member as a structure comprising amorphous germanium or a compound of amorphous germanium having higher transmittance for a wavelength of an infrared ray region than for a wavelength of a visible light region.

13. The liquid crystal display of claim 12, wherein the upper panel further comprises at least one visible-light sensor.

14. The liquid crystal display of claim 12, wherein the infrared sensor further comprises:
an insulating layer disposed under the visible-light blocking member;
an active layer overlapping with the visible-light blocking member and disposed under the insulating layer;
an ohmic contact layer disposed under the active layer;
a source electrode disposed under the ohmic contact layer;
a drain electrode separated from the source electrode and disposed under the ohmic contact layer;
a gate insulating layer disposed under the active layer, the source electrode, and the drain electrode; and
a gate electrode overlapping with the active layer and disposed under the gate insulating layer.

15. The liquid crystal display of claim 12, wherein the structure comprises at least one of an amorphous germanium thin film and an amorphous silicon germanium thin film.

16. The liquid crystal display of claim 15, wherein the structure comprises the amorphous silicon germanium thin film, and
the amorphous silicon germanium thin film comprises germanium at 20 at % to 70 at %.

17. The liquid crystal display of claim 15, wherein the structure comprises a dual thin film structure comprising the amorphous germanium thin film and the amorphous silicon germanium thin film.

18. A visible-light blocking member as a structure, comprising amorphous germanium or a compound of amorphous germanium having higher transmittance for a wavelength of an infrared ray region than for a wavelength of a visible light region,
wherein the structure comprises a dual thin film structure comprising an amorphous germanium thin film and an amorphous silicon germanium thin film.

* * * * *